United States Patent [19]

Garvey

[11] 4,277,026

[45] Jul. 7, 1981

[54] LIQUID CHEMICAL SPRAYING APPARATUS MOVABLE BY A TOWER-TYPE WATER IRRIGATION SYSTEM

[76] Inventor: Peter M. Garvey, Rte. 1, Box 186, Lenox, Ga. 31637

[21] Appl. No.: 123,769

[22] Filed: Feb. 20, 1980

[51] Int. Cl.³ .............................................. B05B 9/00
[52] U.S. Cl. .................................... 239/127; 239/142; 239/177; 239/178; 239/DIG. 1
[58] Field of Search ............... 239/127, 142, 163, 177, 239/178, 302, 566, DIG. 1, 709–711, 717–721

[56] References Cited

U.S. PATENT DOCUMENTS

| | | | |
|---|---|---|---|
| 635,784 | 10/1899 | Kenison | 239/163 |
| 2,692,798 | 10/1954 | Hicks | 239/127 |
| 2,748,944 | 6/1956 | Kalinske | 239/DIG. 1 |
| 3,410,490 | 11/1968 | Smith | 239/178 |
| 3,648,930 | 3/1972 | Brown et al. | 239/720 |
| 3,844,481 | 10/1974 | Livingston | 239/177 |

Primary Examiner—Robert B. Reeves
Assistant Examiner—Michael J. Forman

Attorney, Agent, or Firm—Cushman, Darby & Cushman

[57] ABSTRACT

Apparatus for treating a field crop with liquid chemical for use with a water irrigation system of the type including a plurality of longitudinally spaced towers, and a mechanism for intermittently moving each of the towers to move the system through the field. The apparatus comprises a first assembly for applying liquid chemical to the field crop canopy and/or ground in a first pattern arranged to extend from one of the towers a majority of the distance toward an adjacent tower in amounts which diminish in a direction away from the one tower, a solenoid valve for communicating liquid chemical under pressure with the first pattern applying assembly only when the one tower is in motion. A second assembly for applying liquid chemical to the field crop canopy and/or ground in a second pattern arranged to extend from the adjacent tower for a majority of the distance toward the one tower in amounts which diminish in a direction away from the adjacent tower, and a solenoid valve for communicating liquid chemical under pressure with the second pattern applying means only when the adjacent tower is in motion.

14 Claims, 7 Drawing Figures

LIQUID CHEMICAL SPRAYING APPARATUS MOVABLE BY A TOWER-TYPE WATER IRRIGATION SYSTEM

This invention relates to the application of liquid chemicals to field crops and more particularly to apparatus for treating a field crop with liquid chemical for use with a water irrigation system including a plurality of longitudinally spaced towers, such as a pivot move system or a moving lateral system.

It is the current practice in growing many field crops to utilize pivot move systems and to some extend moving lateral systems for the purpose of providing irrigation water to facilitate the growth of the field crop. It is possible to some instances to supply liquid chemicals to the field crop by introducing the liquid chemical into the water of the irrigation system. However, in most instances the application rate or amount of liquid chemical applied is such that the liquid chemical cannot be distributed in the irrigation water of the system and must be supplied to the field crop by separate devices or means. Conventional separate devices are tractor moved sprayers and airplane sprayers. Both of these prior art modes of applying liquid chemicals have their disadvantages, in addition to being costly.

It has been suggested in the patented literature to provide an auxiliary liquid chemical spraying apparatus for use with a moving lateral irrigation system. In this regard reference is made to U.S. Pat. No. 3,410,490 dated Nov. 12, 1968. The moving lateral system disclosed in the aforesaid patent includes a main conduit supported at longitudinally spaced positions thereon by a plurality of towers. The system disclosed utilizes a single shaft which extends parallel to the conduit for driving the wheels of each of the towers. An arrangement of this type is suitable for operation only in perfectly level fields and under these circumstances the provision of an auxiliary system for distributing liquid chemicals involves simply the provision of an additional conduit of lesser capacity and a series of outlets or spray orifices spaced uniformly along the auxiliary conduit for discharging a uniform amount of liquid chemical along the extent of the main conduit of the system. The supply of the liquid chemical and the means for pressurizing the supply is carried by a trailer hitched to the conduit of the main system and therefore moved through the field by the main system.

In the actual commercial practice of agricultural irrigation, pivot move systems have received more widespread acceptance and it has been only recently that moving lateral systems have been available commercially to any extent. Commercial pivot move systems, as well as lateral move systems, in order to have applicability to installations other than perfectly level fields have all embodied essentially a master-slave guidance system. In a pivot move system the outermost tower constitutes the master and its propulsion system, which typically may be electric although hydraulic and other propulsion systems are available, is adjusted so as to move continuously or intermittently in its circular path. The objective of the master-slave guidance system is to maintain the conduit which extends from the fixed pivot within the field longitudinally into supported relation with the outermost tower in an essentially straight line. This objective is obtained by providing an articulating connection for the conduit at each tower and providing means for sensing any change in the horizontal alignment between the conduit sections supported at any one tower. Whenever a tower is lagging and the angle sensed with respect to that one tower is a predetermined number of degrees more than 180° the propulsion means associated with that tower is actuated to advance the tower until the angle is moved back into 180° relationship or slightly less. In an idealized pivot move system where all of the towers are moved continuously the rate of movement of the tower adjacent the outermost tower would be less than the rate of movement of the outermost tower an amount proportional to the distance from the center pivot. A similar relationship would exist with respect to each adjacent tower proceeding toward the center pivot. In actual practice, however, this difference in required speed is accommodated not by a reduction in the propulsion rate of the towers but rather by allowing the towers to dwell or remain stationary for a portion of the time. Consequently, in the normal operation of the master-slave system, the towers inwardly of the outermost tower are intermittently operated, the intermittent operation being determined, as aforesaid, by the horizontal angle of the conduit sections supported thereby. Indeed, in most pivot move systems the master tower is adjustable in its propulsion rate by intermittently operating the master tower, the amount of dwell time permitted per minute being adjusted downwardly from zero. It is the usual situation that the master tower will be adjusted so that it operates intermittently rather than continuously. Thus, in actual practice all of the towers are intermittently operated and the difference in the required travel by virtue of the position of the tower from the pivot is achieved by an increase in dwell time, the actual propulsion rate of all towers when in motion being the same. In the overall operation of the water irrigation system, the water is applied at a sufficiently high rate to the field that the idle or dwell times to which the various towers are subjected has little or no effect on the overall application of water.

On the other hand, if a smaller auxiliary conduit is provided for the purpose of applying liquid chemicals at the much lower application rate required for these materials, the idling or dwell times incident to the normal operation of the pivot move systems results in a non-uniform application rate which is unacceptable. Thus, for example, those areas in the spray pattern which are sprayed during the dwell time may receive too much liquid chemical whereas those areas in the spray pattern which are sprayed only during the movement of the associated tower may receive too little. Stated differently, when dealing with the application of an amount of liquid chemical which may be from 1/12th to 1/40th or less of the amount of water that is to be applied, the effects of non-uniform movement of the spray nozzles in a pivot move system becomes so significant as to render a uniform auxiliary spray arrangement such as embodied in the aforesaid patent ineffective.

As previously indicated, lateral move systems are currently commercially available and they operate on an essentially similar master-slave system of guidance in which one of the towers is operated at a set intermittent dwell time rate and the other towers constitute slave towers which are intermittently operated in sensed relation to the master tower. Here again, while the dwell times of the towers in a lateral move system may not be as long as the dwell times of the towers nearest the pivot in a pivot move system, nevertheless such dwell times can cause non-uniformity within the spray pattern which becomes significant when dealing with the smaller amounts of liquid chemicals as compared with the larger amounts of irrigation water. Accordingly, while it has been recognized to be desirable to provide an auxiliary liquid chemical spraying system for use with moving lateral systems, the uniform application of the auxiliary systems heretofore proposed could not be effectively utilized in the modern intermittently operable lateral move systems or pivot move systems for the reasons set forth above.

It is an object of the present invention to provide an auxiliary liquid chemical spraying apparatus for use with modern intermittently operable pivot move systems and lateral move systems which obviates the problems of non-uniformity discussed above and provides a sufficiently accurate application of liquid chemicals to render such irrigation systems useful as the means for moving the chemical spraying apparatus through the field.

In accordance with the principles of the present invention this objective is obtained by providing between adjacent towers of the water irrigation system means for applying liquid chemical to the field crop canopy and/or ground in a first pattern arranged to extend from one of the towers a majority of the distance toward an adjacent tower in amounts which diminish in a direction away from the one tower, means for communicating liquid chemical under pressure with the first pattern applying means only when the one tower is in motion, means for applying liquid chemical to the field crop canopy and/or ground in a second pattern arranged to extend from the adjacent tower for a majority of the distance toward the one tower in amounts which diminish in a direction away from the adjacent tower, and means for communicating liquid chemical under pressure with the second pattern applying means only when the adjacent tower is in motion. By operating the chemical applying means only when the associated tower is in motion, non-uniformity by virtue of dwell times is eliminated. By providing essentially elongated triangular shaped application patterns which diminish in a direction away from the adjacent tower, uniformity during motion is achieved.

In most pivot move systems and moving lateral systems the main conduit for carrying the irrigation water is supported a substantial distance above the level of the tower wheels so as to provide clearance of high crops such as corn and the like. Usually, the sprinkler heads for distributing the irrigation water in the conduit are mounted above or at a similar height so as to provide clearance when needed. When dealing with the relatively low amounts of liquid and relatively low application rates incident to the application of liquid chemicals to field crops, considerable inaccuracy may be introduced by providing the discharge orifices of the application means at a relatively high level. This is particularly true where windy conditions tend to prevail. Accordingly, it is desirable in an auxiliary liquid chemical spraying apparatus to provide means for positioning the spray orifices of the liquid chemical applying means closely adjacent the ground. Moreover, it is desirable that the vertical position of the outlets be readily adjustable since, in many instances, it is required that the liquid chemical be applied to the field crop canopy.

Accordingly it is a further object of the present invention to provide a liquid chemical spraying apparatus of the type described which will provide the desirable adjustment noted above.

Another object of the present invention is to provide an apparatus of the type described having improved means for cooperatively integrating the means for handling the irrigation water at the pivot of a pivot move system with the means for providing the liquid water component of the liquid chemical which may be either a solution or emulsion.

These and other objects of the present invention will become more apparent during the course of the following detailed description and appended claims.

The invention may best be understood with reference to the accompanying drawings, wherein an illustrative embodiment is shown.

In the drawings.

Referring now more particularly to the drawings, there is shown in FIGS. 1-4 thereof a water irrigation system of the pivot move type, generally indicated at 10. The pivot move system includes a fixed structure 12 mounted in fixed relation within a field which provides a vertical pivotal axis for an enlongated conduit assembly, generally indicated at 14. Water is supplied to the conduit assembly 14 through a stationary supply pipe 16 fixedly carried by the pivot structure 12 having a swivel coupling 18 on the upper end thereof. Supply pipe 16 receives water under pressure from a pump 20 driven by a suitable engine 22. As shown, pump 20 draws water from a well through an inlet pipe 24 and discharges the same under pressure to an outlet pipe 26. A check valve 28 is connected with the downstream side of the outlet pipe 26 and a horizontal pipe section 30 extends from the check valve to the vertical supply pipe 16.

Figure 1:
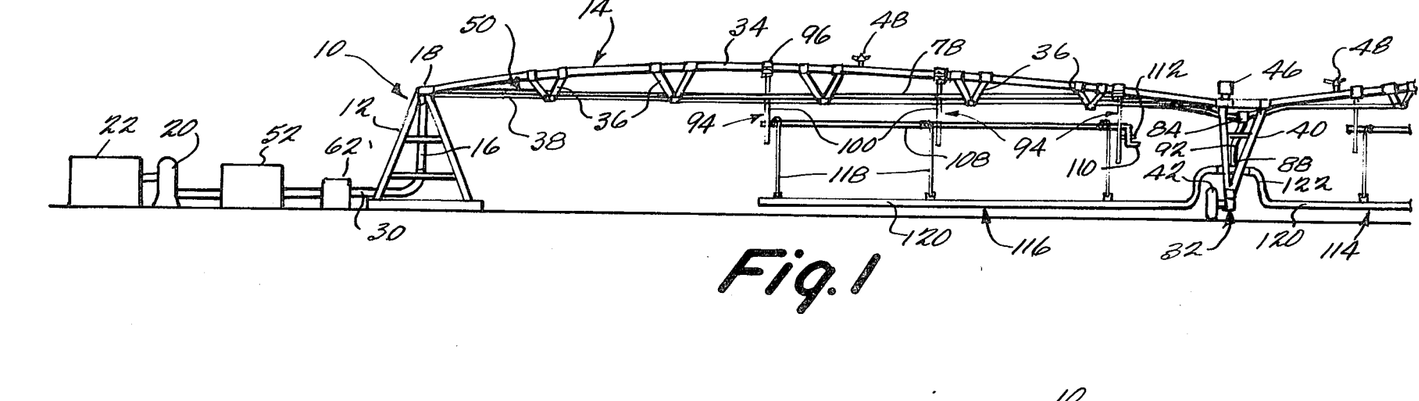
FIG. 1 is a fragmentary side elevational view of a portion of a pivot move system having a liquid chemical spraying apparatus embodying the principles of the present invention.

The conduit assembly 14 is supported for movement along the field by a series of longitudinally spaced tower assemblies, generally indicated at 32. The supporting connection between each tower 32 and the conduit assembly 14 provides for limited articulation of the conduit assembly extending to and from each tower. The conduit assembly 14 includes rigid conduit sections 34 extending longitudinally from the swivel 18 to the first tower 32 and between each adjacent pair of towers radially outwardly therefrom. Each conduit section 34 is bowed upwardly and has a series of trusses 36 fixed thereto, the trusses being interconnected by tie rods or cables 38.

Figure 3:
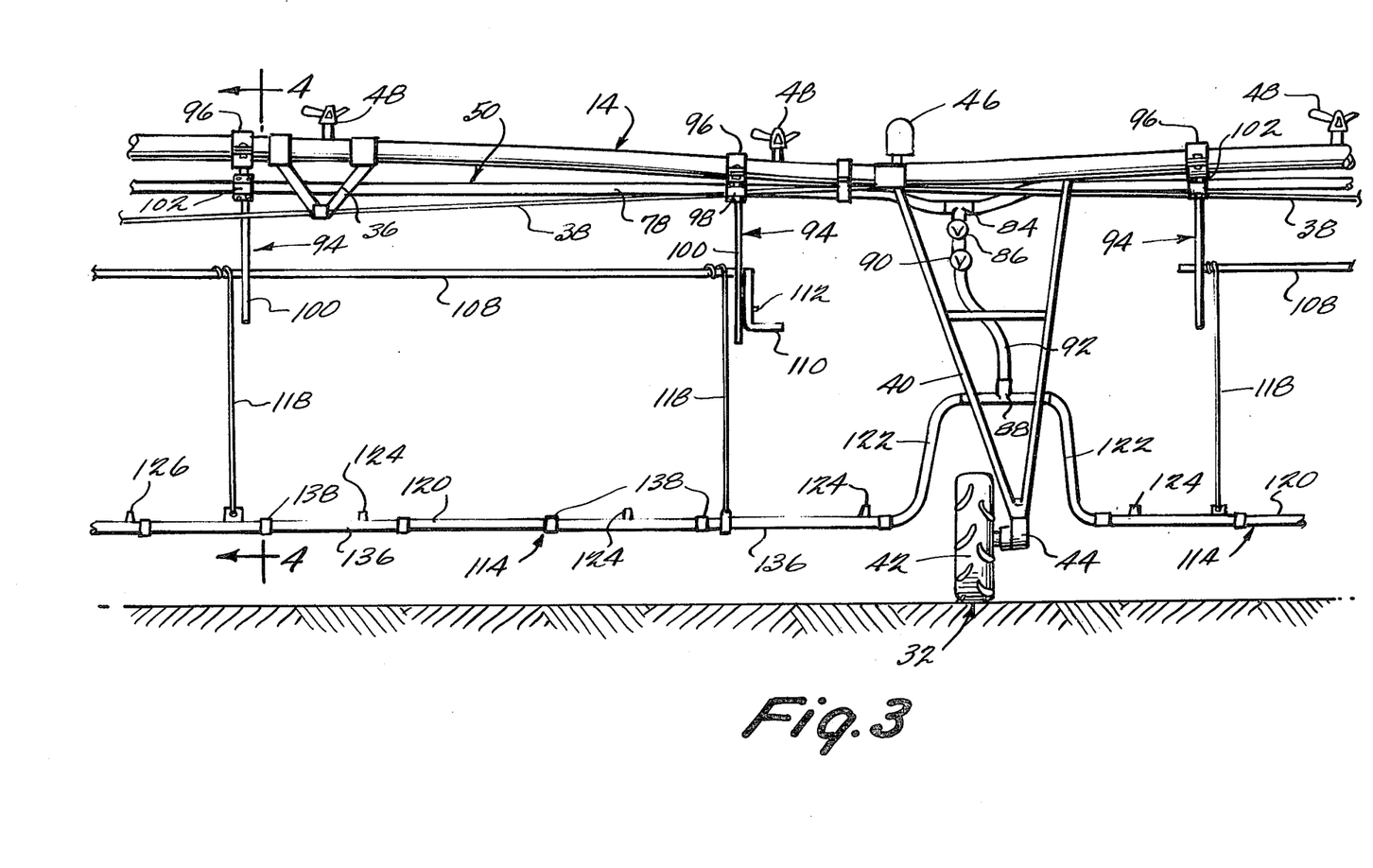
FIG. 3 is an enlarged fragmentary side elevational view of a tower of the pivot move system with the auxiliary liquid chemical spraying apparatus of the present invention applied thereto.

Each tower assembly 32 includes an upstanding frame structure 40 having a pair of wheels 42 journaled on the lower portion thereof, the wheels 42 are driven by any suitable propulsion means, as for example, an electric motor and gear assembly 44, the operation of which is controlled by a conduit section angle sensing mechanism 46. Mounted on each conduit section 34 in longitudinally spaced relation therealong is a series of sprinkler heads 48. It will be understood that the construction and operation of the pivot move system 10 as described above is entirely conventional. The exact construction of the various components described may be in accordance with any of the well-known commercial designs presently available on the market.

For present purposes it is sufficient to note that in the normal operation of the pivot move system 10 the outermost tower assembly functions as the master of the master-slave guidance system. Consequently, rather than an angle sensing mechanism 46, the electric motor and gear assembly 44 of the outermost tower is under the control of a timer mechanism (not shown) which enables the operator to adjust and determine the relative proportions of each minute when the electric motor and gear assembly 44 is energized and de-energized. The electric motor and gear assembly 44 of each tower, when energized, serves to propel each tower at the same rate of movement, both master and slave. The angle sensing mechanism 46 associated with each slave tower serves to energize the associated electric motor and gear assembly 44 so long as the conduit sections associated with the tower are within a predetermined lag angle and lead angle. In this way the proportionate lesser linear travel of each tower proceeding away from the outermost master tower is automatically accomplished by increasing the dwell time thereof.

Figure 2:
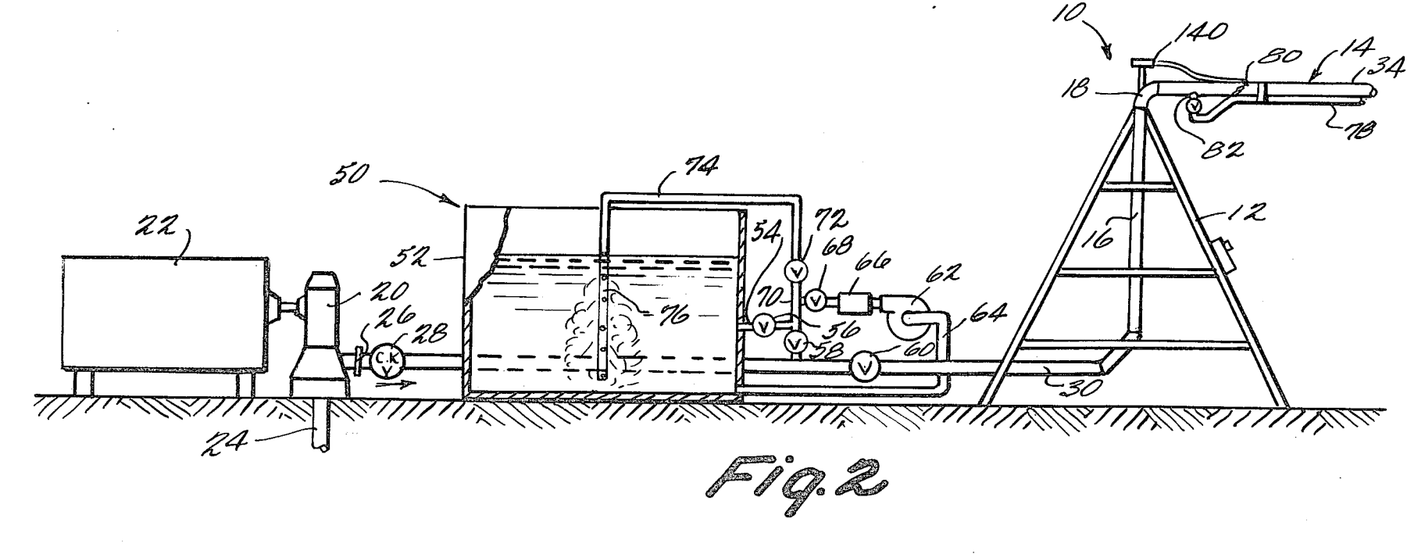
FIG. 2 is an enlarged fragmentary side elevational view of the portion of the apparatus utilized to supply the liquid chemical under pressure to the pivot move system.

The present invention is more particularly concerned with the utilization of the pivot move system 10 as a means for propelling an apparatus, generally indicated at 50, for treating the field crop normally irrigated by water issuing from the pivot move system with liquid chemical. The apparatus 50 includes a supply tank 52 for the liquid chemical to be applied. It will be understood that the liquid chemical may be either a solution or a suspension, the liquid component preferably being water and the chemical component may be a fertilizer, an insecticide, a fungicide, a herbicide, a miticide, or other known chemical treatment additive. Tank 52 is provided with a liquid supply pipe 54 which is controlled by a valve 56. Valve 56 is connected to the horizontal pipe 30 of the main conduit line through a control valve 58. Valve 60 is mounted within the pipe in a position downstream of the connection of the valve 58 therewith so that by closing valve 60 and opening valve 58 water from the well pipe 24 can be pumped by the pump 20 into the supply tank 52 through open valves 58 and 56.

The apparatus 50 also includes a supply pump 62 for delivering liquid chemical under pressure from the supply tank to be applied to the field crop. It will be understood that the pump is driven by a suitable electric motor or the like (not shown). The suction side of the pump is connected as by a pipe 64 to the bottom of the tank 52. The high pressure outlet of the pump leads to a filter 66 which, in turn, leads to a control valve 68. The outlet side of valve 68 has a T fitting 70 connected therewith, one branch of which communicates with the pipe connecting valves 58 and 56. The other branch of the T fitting 70 communicates with one side of a control valve 72, the opposite side of which communicates with a pipe 74 leading to an agitator pipe assembly 76 extending into the supply tank 52.

With the arrangement thusfar described the supply pipe 16, swivel 18 and the horizontal feed pipe 30 for supplying irrigation water to the main conduit are utilized to transmit liquid chemical from the supply pipe to an auxiliary supply line 78 carried by the main conduit assembly of the pivot move system. To this end, the portion of the innermost conduit section 34 connected with the swivel fitting 18 has a butterfly valve 80 connected therewith which in one open position of manual adjustment communicates the swivel fitting 18 to the entire conduit assembly and in a closed position closes off such communication.

As best shown in FIG. 2, the inlet end of the auxiliary supply conduit 78 is connected with the swivel 18 through a control valve 82 communicating between the bufferfly valve 80 and swivel 18. Auxiliary supply conduit 78 has a T fitting 84 therein adjacent each tower assembly 32. The outlet of each T fitting leads to a solenoid operated valve 86. Solenoid operated valve 86 leads to a fixed T fitting 88 carried by the associated tower structure 40. Preferably a pressure regulating valve 90 is mounted within conduit 92 which serves to communicate each solenoid control valve 86 with the associated T fitting 88.

Figure 4:
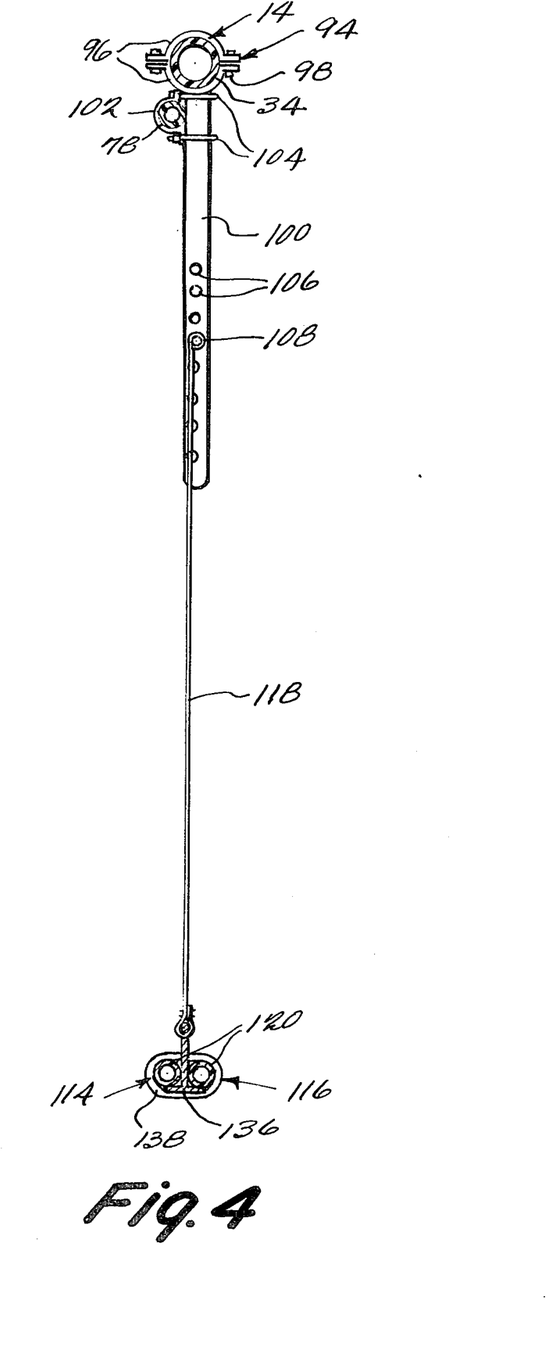
FIG. 4 is a fragmentary cross-sectional view taken along the line 4—4 of FIG. 3.

Referring now more particularly to FIG. 4, it will be noted that the auxiliary supply line 78 is suspended in a position slightly below the main conduit assembly 14 of the pivot move system 10 by a series of longitudinally spaced hanger assemblies, generally indicated at 94. As shown, each hanger assembly 94 includes cooperative C-clamp elements 96 capable of being fixedly secured together in surrounding relation to the associated main conduit section 34, as by bolts 98 and a depending strap 100 fixed as by welding at its upper end to the lower C-clamp element 96. A clamp element 102 shaped to receive the auxiliary supply conduit 78 is secured to the strap 100 as by U-bolts 104 or the like. The lower portion of each strap 100 is formed with a series of vertically spaced openings 106. Extending through aligned openings in the straps associated with each conduit section 34 is an elongated rod or pipe 108. A crank 110 is formed on one end thereof and a removable stop pin 112 is provided in the associated hanger strap for preventing rotation of the crank in one direction when engaged within one of the openings 106. By removing the pin 112, crank 110 can be turned to rotate the rod 108 within the strap openings 106 through which they extend. Turning of the rod 108 serves to adjust first and second liquid chemical applying assemblies 114 and 116 suspended from the rod by a series of flexible cables 118.

The liquid chemical applying assemblies 114 and 116 are essentially of identical construction so that a description of one will suffice to provide an understanding of both. As shown, each of the assemblies includes an elongated section of flexible pipe 120. As shown, the length of each pipe is sufficient to extend substantially the entire distance between adjacent pairs of towers. With this construction there is a pair of conduits or flexible pipes 120 mounted in side-by-side relation extending in generally parallel relation with the main conduit in suspended relation by the cables 118 between each pair of adjacent towers. The T fitting 88 associated with each tower is connected to one end of each of the pairs of conduits 120 as by a section of flexible hose 122. Thus, with respect to each tower there is a first chemical applying assembly 114 and a second chemical applying assembly 116, each of which embodies an elongated pipe 120 extending longitudinally outwardly from the tower in opposite directions. Since the hoses 122 by which the pipes 120 of both pair of these assemblies receive liquid chemical are connected with the associated T fitting 88, the supply of liquid chemical from the auxiliary supply line 78 to the associated T fitting 84 is controlled by the associated solenoid valve 86. When liquid chemical from the supply line 78 is allowed to pass through the solenoid valve 86 to the associated fitting 88 liquid chemical under pressure will be communicated through the associated lines 122 to the associated pipes 120, each of which has a series of outlet spray nozzles mounted therein.

It will be understood that each of the solenoid valves 86 is connected within the energizing circuit to the electric motor and gear unit 44 of the associated tower assembly so that when the associated angle sensing mechanism 46 is operable to energize the associated electric motor and gear unit 44 the associated solenoid valve 86 will be energized and moved to an open position to communicate the auxiliary liquid chemical supply line 78 to the associated liquid chemical supplying mechanisms 114 and 116. Similarly, when the associated angle sensing mechanism 46 is operated to de-energize the associated electric motor and gear unit 44, the associated solenoid valve 86 will be de-energized and moved into a closed position, shutting off communication from the auxiliary liquid chemical supply line 78 to the associated liquid chemical applying mechanisms 114 and 116. In this way, the liquid chemical applying mechanisms associated with each tower are operable to apply liquid chemical to the field crop canopy and/or ground only when the associated tower is in motion. During the dwell time of the associated tower assembly, the associated liquid chemical applying mechanisms 114 and 116 are shut down.

Figure 5:
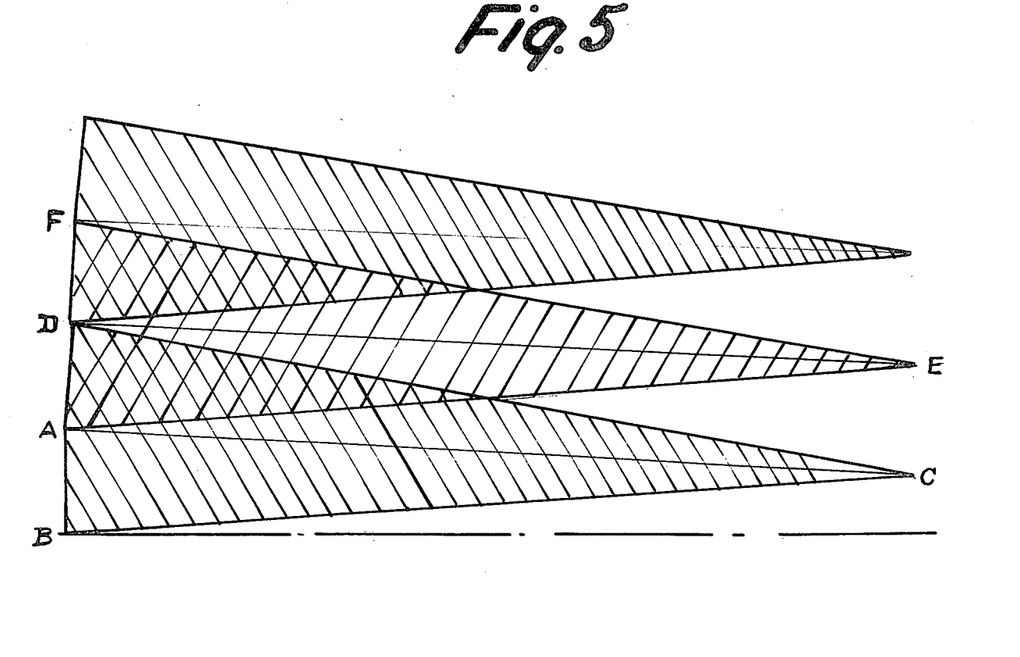
FIG. 5 is a diagrammatic top plan view illustrating an idealized liquid chemical spray pattern extending from one tower in a direction toward the next adjacent tower illustrating the distribution of the spray pattern to the crop canopy and/or ground during movement of the adjacent tower and the next adjacent tower.
Figure 6:
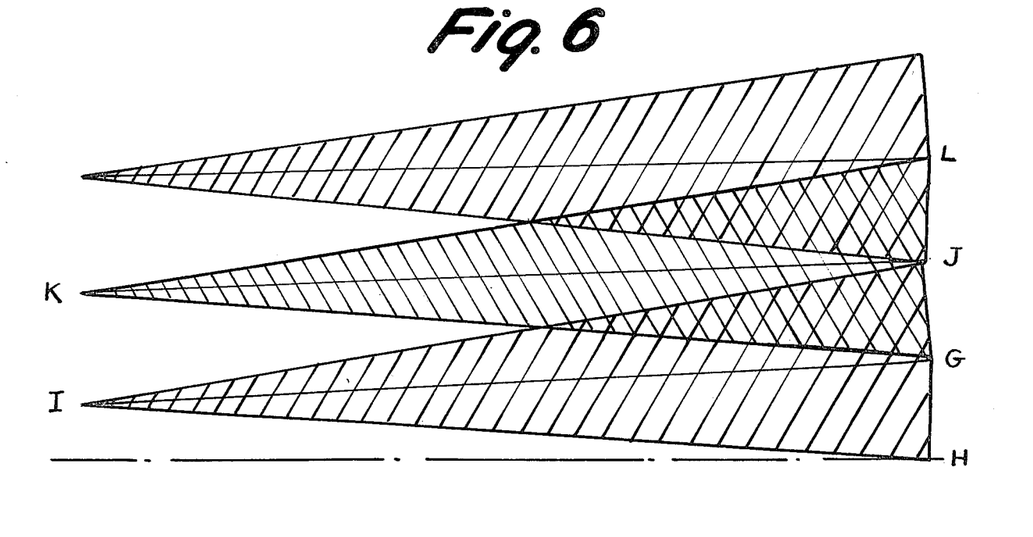
FIG. 6 is a view similar to FIG. 5 showing the spray pattern associated with the next adjacent tower and its distribution during the movement of both of the associated towers.

The total combined spray pattern achieved by the outlet spray nozzles associated with each of the first and second liquid chemical applying assemblies 114 and 116 constitutes an important aspect of the present invention. FIGS. 5 and 6 illustrate idealized patterns of each respectively and the application thereof to the field crop canopy and/or ground during the normal operation of the apparatus 50 in conjunction with the operation of the pivot move system 10. FIG. 5 illustrates the idealized shape of the pattern produced by a liquid chemical applying assembly 114 viewed in plan. Since the idealized pattern extends between adjacent towers, in FIG. 5 it should be assumed that a pair of towers is on opposite sides of the pattern shown, one to the right and one to the left and that the direction of movement of the towers is from the bottom of the sheet toward the top. The pattern formed by the assembly 114 would have its liquid chemical coming from the tower to the left. The idealized pattern is represented by the triangle interconnecting the points A B C. The idealized pattern would be one in which liquid chemical is distributed within the pattern equally throughout at a constant rate so that the amount of liquid distributed progressively diminishes in a direction outwardly from the left-hand tower. The distance A B represents the distance that the operative left tower moves during each intermittent movement. Thus, at the end of a movement the idealized pattern has moved from the position A B C to the position D A C and water has been distributed in the triangle D B C evenly throughout. In the normal operation it would be assumed that the right-hand tower would advance during the dwell time of the left-hand tower and this movement is represented by the distance C E. Thus, when the left-hand tower is again actuated, the idealized spray pattern is now in the position D A E and during its next movement the pattern will end up in the position F D E.

FIG. 6 illustrates the idealized pattern produced by the liquid chemical applying assembly 116 extending between the same two towers in side-by-side relation with the assembly 114 which produces the pattern of FIG. 5. The idealized pattern of FIG. 6 is under the control of the right-hand tower and it represents a triangle G H I in which the amount of water applied progressively diminishes in a direction away from the right-hand tower toward the left-hand tower. Here again, the distance H G represents one incremental movement of the right-hand tower so that at the end of this movement the idealized pattern is in the position J G I and a triangle has been covered equal to J H I. Again it is assumed that during the dwell time of the right-hand tower the left-hand tower will move from the position an incremental movement represented by the distance I K. Thus, the idealizied pattern is now in a position to apply liquid chemical to the triangle J G K so that when the next incremental movement of the right-hand tower from G to J is accomplished the idealized pattern assumes the position L J K.

The total pattern of liquid chemical application between each pair of adjacent towers can now be visualized by superimposing the patterns shown in FIGS. 5 and 6 and it will be noted that they are essentially symmetrical about a median vertical plane so that an equal amount of liquid is distributed as the two associated towers advance. It will be noted that this equal distribution of liquid chemical is obtained irrespective of whether either of the towers is moving alone or both are moving together. Also, uniform application of liquid will be achieved even though the time of the movement of one of the towers differs from the time of movement of the other, as would be the case in the pivot move system 10.

When it is considered that a typical distance between the adjacent towers of a commercial pivot move system is 164 feet, as for example, in towers 1-4, and 124 feet between towers 4 and 5, and that the amount of liquid chemical to be applied is in the neighborhood of 200 gallons per acre, it will be appreciated that the idealized application patterns shown in FIGS. 5 and 6 can only be approximated in actual practice.

Figure 7:
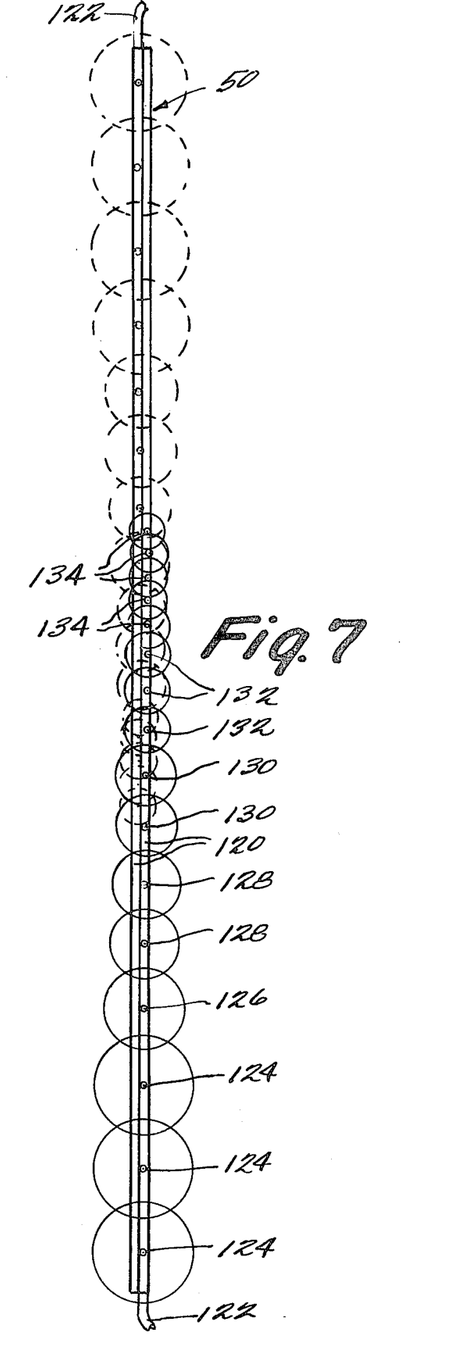
FIG. 7 is a diagrammatic view illustrating the instantaneous individual spray patterns of an exemplary embodiment of the liquid chemical applying means of the present invention corresponding with the idealized spray patterns shown in FIGS. 5 and 6.

FIG. 7 represents one exemplary embodiment of an actual spray pattern achieved by virtue of two adjacent assemblies 114 and 116, the pattern of the assembly 114 being shown in solid lines and the pattern of the assembly 116 being shown in dotted lines. It is noted that both patterns are identical and are provided by a series of outlet spray nozzles. In the exemplary embodiment shown, the first three outlet spray nozzles, designated by the reference numeral 124, are of the same size being spaced apart approximately 11 feet, and each produces a 14 foot diameter circular spray pattern at a rate of 32 gallons per hour. The next outlet spray nozzle 126 is spaced outwardly approximately 10 feet from the last of the three initial spray nozzles 124 and produces an 11 foot diameter circular spray pattern at a rate of 27 gallons per hour. The next outlet spray nozzle 128 is spaced a distance of approximately 8½ feet and produces a 9½ foot diameter circular spray pattern at a rate of 18 gallons per hour. The next outlet spray nozzle 128 is an identical spray nozzle, spaced 8 feet from the last. Following the last spray nozzle 128, a pair of similar spray nozzles 130 is provided, the first being spaced 7½ feet from the last nozzle 128 and the two being spaced apart 7 feet. Each of the outlet spray nozzles 130 produces an 8 foot diameter circular spray pattern at a rate of 15 gallons per hour. Next, there are provided three outlet spray nozzles 132, the first of which is spaced 6 feet from the last outlet spray nozzle 130 and the spacing between each adjacent pair of which is 5 feet. Each of the three outlet spray nozzles 132 produces a 6½ foot diameter circular spray pattern at a rate of 9 gallons per hour. Finally, there are provided five outlet spray nozzles 134 which are spaced apart with respect to one another 3 feet, with the innermost one of the series being spaced 4 feet from the outermost outlet spray nozzle 132. Each of the outlet spray nozzles 134 produces a 5 foot diameter circular spray pattern at a rate of 5 gallons per hour. The outlet spray nozzles 134 represent approximately the smallest size nozzle that can be utilized without presenting a serious clogging problem.

As previously indicated, in the embodiment shown in FIG. 7 the tube 120 within which the various outlet spray nozzles are mounted extends from the tower from which it receives liquid chemical through its flexible feed hose 122 completely to the next adjacent tower. Likewise, the associated liquid chemical applying mechanism 116 consists of an identical unit with the pipe 120 reversed in extent and disposed in abutting parallel relation. This arrangement is preferred where the pipe 120 utilized is plastic pipe because of its flexibility and therefore the need to provide a greater support for the same when filled with liquid chemical.

As best shown in FIG. 4, to further aid in providing the support necessary where the pipes 120 are of plastic material, T bars 136 are provided in supported relation with the lower end of the cables 118, the adjacent sections of the pipes 120 being supported above the flanges of the T bars and held therein as by straps or tape 138. It will be understood that since the outermost outlet spray nozzles 134 are spaced considerably from the outermost end (which is plugged) of each of the pipes 120, the portion of the pipe outwardly of the outermost outlet spray nozzle can be eliminated. It will also be noted that the extent of the actual total spray pattern achieved by the series of outlet spray nozzles embodied in each liquid chemical applying mechanism extends a majority of the distance from its operative tower assembly to the next adjacent tower assembly. In the preferred embodiment described above there is an overlap of the outer extent of two adjacent total spray patterns of approximately 37 feet. Stated differently, the total pattern of each applying mechanism extends beyond the mid-point approximately 18½ feet.

It will also be noted that the practical difference between the actual spray patterns of FIG. 7 and the idealized spray patterns of FIGS. 5 and 6 is that the pointed outermost portions of the idealized triangular patterns are eliminated and the innermost portions of the idealized patterns which are essentially trapezoids become rectangles. In this way, the actual patterns as shown in FIG. 7 closely approximate the idealized patterns shown in FIGS. 5 and 6 and accordingly a substantially uniform application of liquid chemical of approximately 200 gallons per acre is achieved by the operation of the apparatus 50.

In actual operation it is preferred to mount the smaller outlet spray nozzles 130, 132 and 134 on the lower wall of the pipe 120 so that the spray issuing therefrom is directed downwardly. The rate of discharge of water from these nozzles is sufficiently low that if mounted on the upper portion of the wall of the pipes 120 so that the supply is directed upwardly an amount of water would be deposited on the pipes herebelow and drip therefrom to an extent sufficient to introduce non-uniformity. With the larger spray nozzles such drippage would be sufficiently insignificant as to essentially have no effect on the uniformity.

From the above it is believed that the operation of the apparatus 50 will be apparent. It will be understood that the first tower assembly spaced outwardly from the pivot structure has only one spray applying mechanism therein. Similarly the spray mechanism extending radially outwardly from the outermost master tower assembly should have a spray pattern which differs from the others in that it would be desirable for the amount of liquid sprayed to increase radially outwardly from the last tower, rather than decrease. In general it can be stated that between any two towers of the system there would be two liquid chemical applying mechanisms 114 and 116 similar to those shown in FIG. 7.

With the arrangement thus far described the apparatus 50 is capable of operation only when the main irrigation water distributing conduit assembly of the pivot move system is shut down, as by closing butterfly valve 80. Normally separate operation would be desirable since superimposing an increased amount of irrigation water on top of the applied liquid chemical would presumably diminish the effectiveness of the latter. It will be understood that the pivot move system 10 is operable to distribute irrigation water to the field when valves 60 and 80 are opened, valves 58 and 82 are closed and pump 20 is operated by engine 22. Of course the electrical controls for the guidance system must likewise be set into motion. Such controls are normally mounted adjacent the stationary pivot and are electrically connected wih the moving conduit assembly 14 through a rotary distributor 140 (see FIG. 2).

When it is desired to utilize the apparatus 50 the operation of the pivot move system 10 is shut down, including the electrical system and the engine 22 for the pump 20. Tank 52 is filled with the water component of the liquid chemical from the source pipe 24 by closing valves 60, 68 and 72 and opening valves 56 and 58. By operating the pump 20 with the engine 22, water from the source pipe 24 is moved through the outlet 26, past the check valve 28, through pipe sections 30 and 54 and into the tank 52. The chemical component of the liquid chemical to be supplied, which may be either a solution or an emulsion, is added to the tank. Valves 56 and 58 are then closed and valves 68 and 72 are opened. Now, by actuating pump 62, the water and chemical components placed in the tank 52 are recycled through lines 64 and 74 through the agitator pipe assembly 76 and this operation is continued until the liquid chemical is either a homogenous solution or emulsion.

In order to communicate the liquid chemical within the tank 52 with the auxiliary supply conduit 78 carried by the pivot move system 10, butterfly valve 80 is 
closed and valves 58, 60 and 82 are opened. It is noted that since valve 72 remains open that a portion of the liquid chemical pumped by pump 62 from the tank 52 will be re-circulated back to the tank through the agitator pipe assembly 76. Valve 72 may require adjustment to achieve the desired output of liquid chemical through pivot pipe 16, swivel coupling 18, through valve 82 into the supply line 778. Once the liquid chemical within the tank 52 is communicated with the supply line, the electrical circuitry of the pivot move system 10 is actuated to commence the tower movement and the various liquid chemical applying mechanisms 114 and 116 provided will apply the liquid chemical to the crop canopy and/or ground in the manner previously described depending upon the conditions in the field. Also as previously indicated, the conditions in the field will determine the position of vertical adjustment of the various liquid chemical applying mechanisms.

It will be understood that while the apparatus 50 has been described as being operable only when the irrigation water sprinkler heads are shut down, it would be possible to provide for simultaneous operation by providing a separate connection through the pivot assembly rather than utilizing the same connection for both water and liquid chemical. It will also be understood that while the present apparatus 50 has been described in connection with a conventional pivot move system 10, the apparatus could be utilized with a moving lateral system as well.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Apparatus for treating a field crop with liquid chemical for use with a water irrigation system of the type including a plurality of longitudinally spaced towers, and means for intermittently moving each of said towers to move the system through the field, said apparatus comprising:

means for applying liquid chemical to the field crop canopy and/or ground in a first pattern arranged to extend from one of said towers a majority of the distance toward an adjacent tower in amounts which diminish in a direction away from said one tower, means for communicating liquid chemical under pressure with said first pattern applying means only when said one tower is in motion, means for applying liquid chemical to the field crop canopy and/or ground in a second pattern arranged to extend from said adjacent tower for a majority of the distance toward said one tower in amounts which diminish in a direction away from said adjacent tower, and means for communicating liquid chemical under pressure with said second pattern applying means only when said adjacent tower is in motion.

2. Apparatus for treating a field crop with liquid chemical comprising:

a water irrigation system of the type including a main conduit having a plurality of water sprinkler heads thereon a plurality of longitudinally spaced towers movingly supporting said main conduit and sprinker heads, and means for intermittently moving each of said towers to move the main conduit and sprinkler heads thereon through the field, means separate from said main conduit means and sprinkler heads for applying liquid chemical to the field crop canopy and/or ground in a first pattern extending from one of said towers a majority of the distance toward an adjacent tower in amounts which diminish in a direction away from said one tower, means for communicating liquid chemical under pressure with said first pattern applying means only when said one tower is in motion, means separate from said main conduit means and sprinkler heads for applying liquid chemical to the field crop canopy and/or ground in a second pattern extending from said adjacent tower for a majority of the distance toward said one tower in amounts which diminish in a direction away from said adjacent tower, and means for communicating liquid chemical under pressure with said second pattern applying means only when said adjacent tower is in motion.

3. Apparatus for treating a field crop with liquid chemical comprising:

a pivot move water irrigation system of the type including a stationary structure providing a swivel fitting movable about a fixed vertical axis, a main conduit having one end connected with said swivel fitting and a plurality of water sprinkler heads thereon, a plurality of longitudinally spaced towers movingly supporting said main conduit and sprinkler heads, and means for intermittently moving each of said towers to move the main conduit and sprinkler heads thereon through the field about the axis of said swivel fitting, means separate from said main conduit means and sprinkler heads for applying liquid chemical to the field crop canopy and/or ground in a first pattern extending from one of said towers a majority of the distinace toward an adjacent tower in amounts which diminish in a direction away from said one tower, means for communicating liquid chemical under pressure with said first pattern applying means only when said one tower is in motion, means spearate from said main conduit means and sprinkler heads for applying liquid chemical to the field crop canopy and/or ground in a second pattern extending from said adjacent tower for a majority of the distance toward said one tower in amounts which diminish in a direction away from said adjacent tower, and means for communicating liquid chemical under pressure with said second pattern applying means only when said adjacent tower is in motion.

4. Apparatus as defined in claims 1, 2 or 3 wherein first and second pattern applying means and liquid chemical communicating means for each is provided between each adjacent pair of towers of said water irrigation system.

5. Apparatus as defined in claim 4 wherein said liquid chemical communicating means comprises a liquid chemical supply line arranged to be extended longitudinally from tower to tower, a feed line communicating with said supply line at each tower, a T-fitting communicating each feed line with (1) a first pattern applying means extending in one direction from the associated tower and (2) a second pattern applying means extending in the opposite direction from the associated tower and a solenoid operated valve in said feed line.

6. Apparatus as defined in claim 5 wherein said first and second pattern applying means each includes an elongated pipe having a series of communicating outlet spray nozzles mounted in longitudinally spaced relation therealong.

7. Apparatus as defined in claim 6 wherein said liquid chemical communicating means further includes a flexible hose communicatively connected between the associated T-fitting and the adjacent ends of the associated pipes, and means for mounting the pipes of the first and second pattern applying means extending between each pair of towers for vertical movement together into a desired one of a multiplicity of different positions of vertical adjustment.

8. Apparatus as defined in claim 7 wherein said mounting means for each pair of pipes includes an elongated member mounted for rotation about an axis generally parallel to said pipes and a plurality of flexible elongated elements wrapped around said elongated member and extending downwardly therefrom in supported relation to said pipes.

9. Apparatus as defined in claim 3 wherein said pivot move system includes a power driven water pump for drawing water from a water supply and delivering the same under pressure, said liquid chemical communicating means including a liquid chemical supply tank for containing a supply of liquid chemical, and a power driven liquid chemical pump for drawing liquid chemical from said liquid chemical supply tank and delivering the same under pressure, input valve means upstream from said swivel fitting for selectively communicating liquid chemical under pressure delivered by said liquid chemical pump or water under pressure delivered by said liquid water pump with the upstream side of said swivel fitting, and output valve means downstream from said swivel fitting for (1) communicating said liquid chemical supply line with the downstream side of said swivel fitting and closing off communication of said main conduit means therewith when said input valve means is operable to communicate liquid chemical under pressure with the upstream side of said swivel fitting and (2) communicating the main conduit means with the downstream side of said swivel fitting and closing off communication of said liquid chemical supply line therewith when said input valve means is operable to communicate water under pressure with the upstream side of said swivel fitting.

10. Apparatus as defined in claim 9 wherein said liquid chemical tank has a water line communicating therewith for delivering water into said liquid chemical tank to form a liquid component of the liquid chemical supply, and means for selectively communicating said water line with water under pressure delivered by said water pump.

11. Apparatus as defined in claim 9 or 10 wherein a liquid jet agitating pipe assembly extends into said liquid chemical supply tank and means is provided for selectively diverting a portion of the liquid chemical under pressure delivered by said liquid chemical pump to said agitating pipe assembly.

12. Apparatus for treating a field crop with liquid chemical comprising: a pivot move water irrigation system of the type including a stationary structure providing a swivel fitting movable about a fixed vertical axis, a power driven water pump for drawing water from a supply and delivering the same under pressure, a main conduuit having one end connected with said swivel fitting and a plurality of water sprinkler heads thereon, a plurality of longitudinally spaced towers movingly supporting said main conduit and sprinkler heads, and means for intermittently moving each of said towers to move the main conduit and sprinkler heads thereon through the field about the axis of said swivel fitting, a liquid chemical supply tank for containing a supply of liquid chemical, a power driven liquid chemical pump for drawing liquid chemical from said liquid chemical supply tank and delivering the same under pressure and a liquid chemical supply line extending generally parallel with said main conduit, liquid chemical applying means communicating with said liquid chemical supply line, input valve means upstream from said fitting for selectively communicating liquid chemical under pressure delivered by said liquid chemical pump or water under pressure delivered by said liquid water pump with the upstream side of said swivel fitting, and output valve means downstream from said swivel fitting for (1) communicating said liquid chemical supply line with the downstream side of said swivel fitting and closing off communication of said main conduit means therewith when said input valve means is operable to communicate liquid chemical under pressure with the upstream side of said swivel fitting and (2) communicating the main conduit means with the downstream side of said swivel fitting and closing off communication of said liquid chemical supply line therewith when said input valve means is operable to communicate water under pressure with the upstream side of said swivel fitting.

13. Apparatus as defined in claim 12 wherein said liquid chemical tank has a water line communicating therewith for delivering water into said liquid chemical tank to form a liquid component of the liquid chemical supply, and means for selectively communicating said water line with water under pressure delivered by said water pump.

14. Apparatus as defined in claim 12 or 13 wherein a liquid jet agitating pipe assembly extends into said liquid chemical supply tank and means is provided for selectively diverting a portion of the liquid chemical under pressure delivered by said liquid chemical pump to said agitating pipe assembly.

* * * * *